June 18, 1968 R. ROSENBAUM 3,388,873
FILM REWIND FOR MOTION PICTURE PROJECTOR
Filed Sept. 8, 1966 8 Sheets-Sheet 3
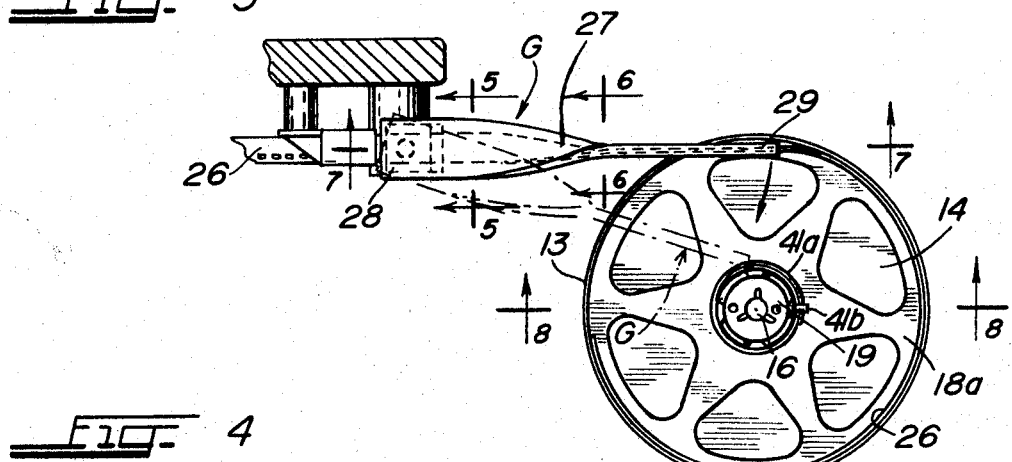
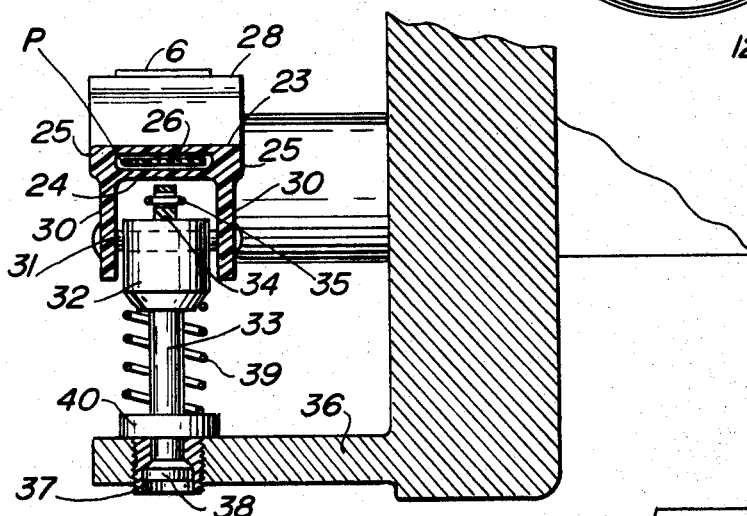
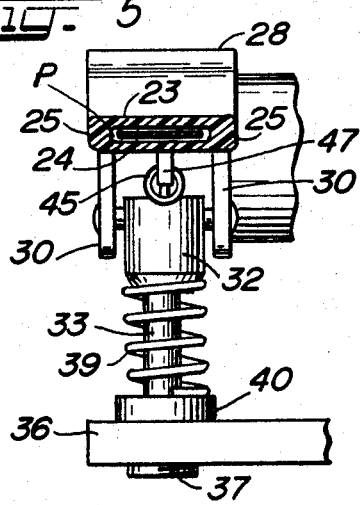
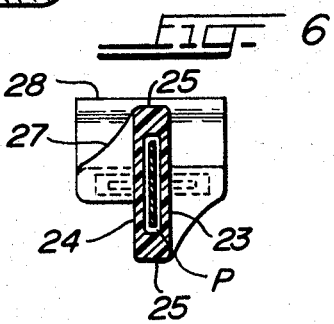
INVENTOR.
ROBERT ROSENBAUM
BY Rummler & Snow
ATTYS.

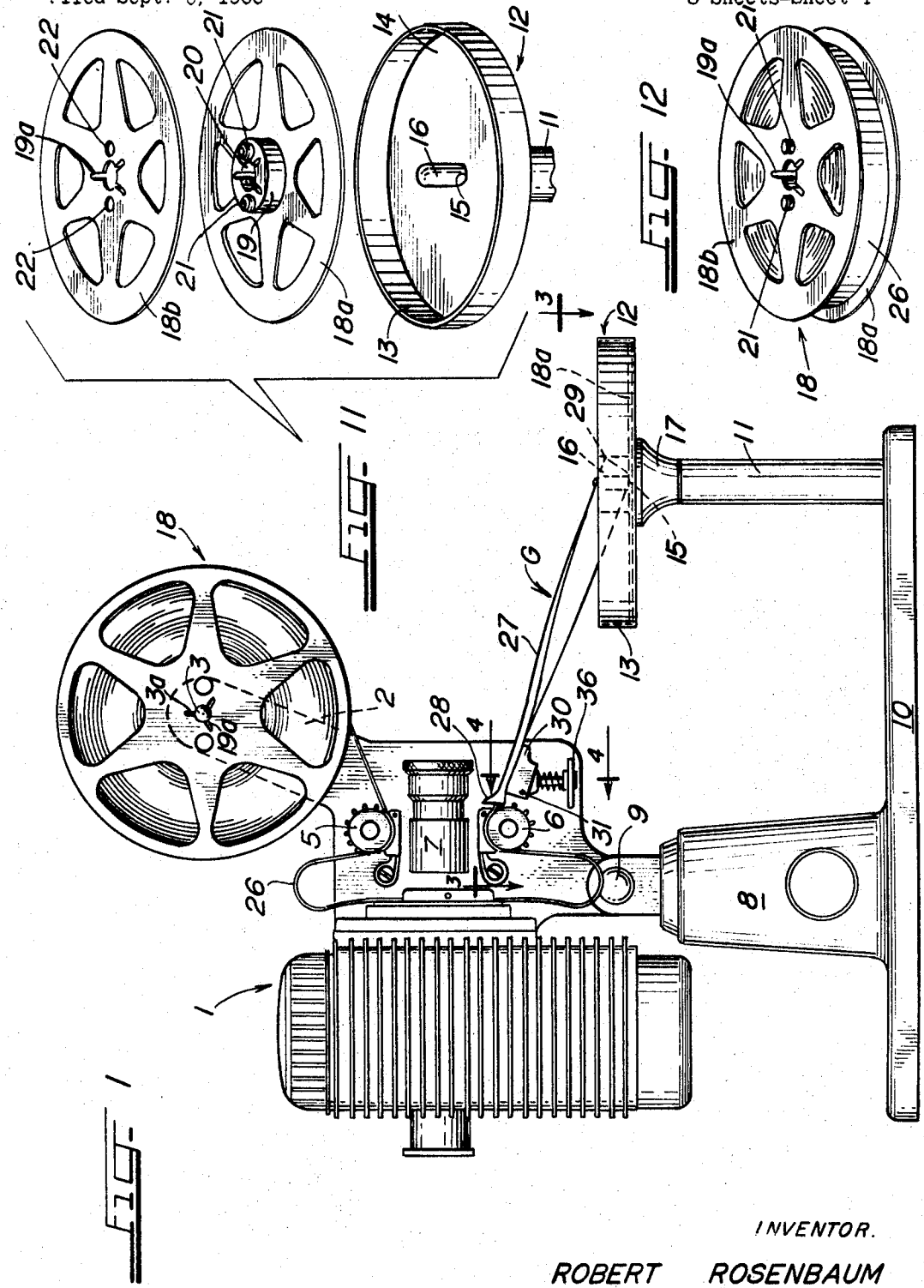

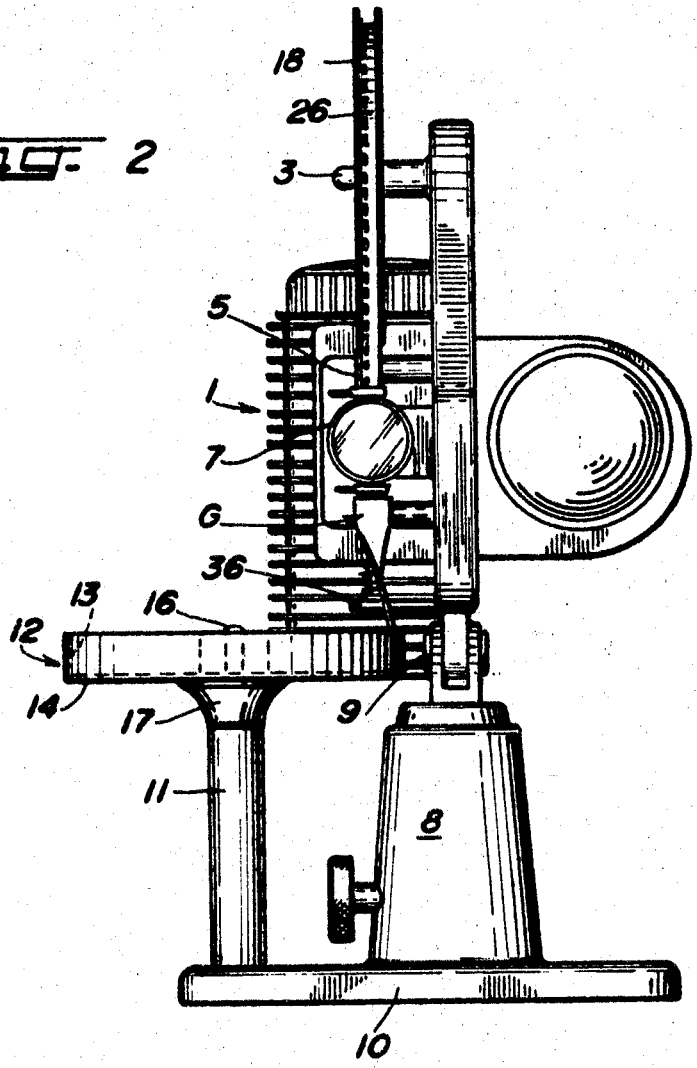

June 18, 1968  R. ROSENBAUM  3,388,873
FILM REWIND FOR MOTION PICTURE PROJECTOR
Filed Sept. 8, 1966  8 Sheets-Sheet 4
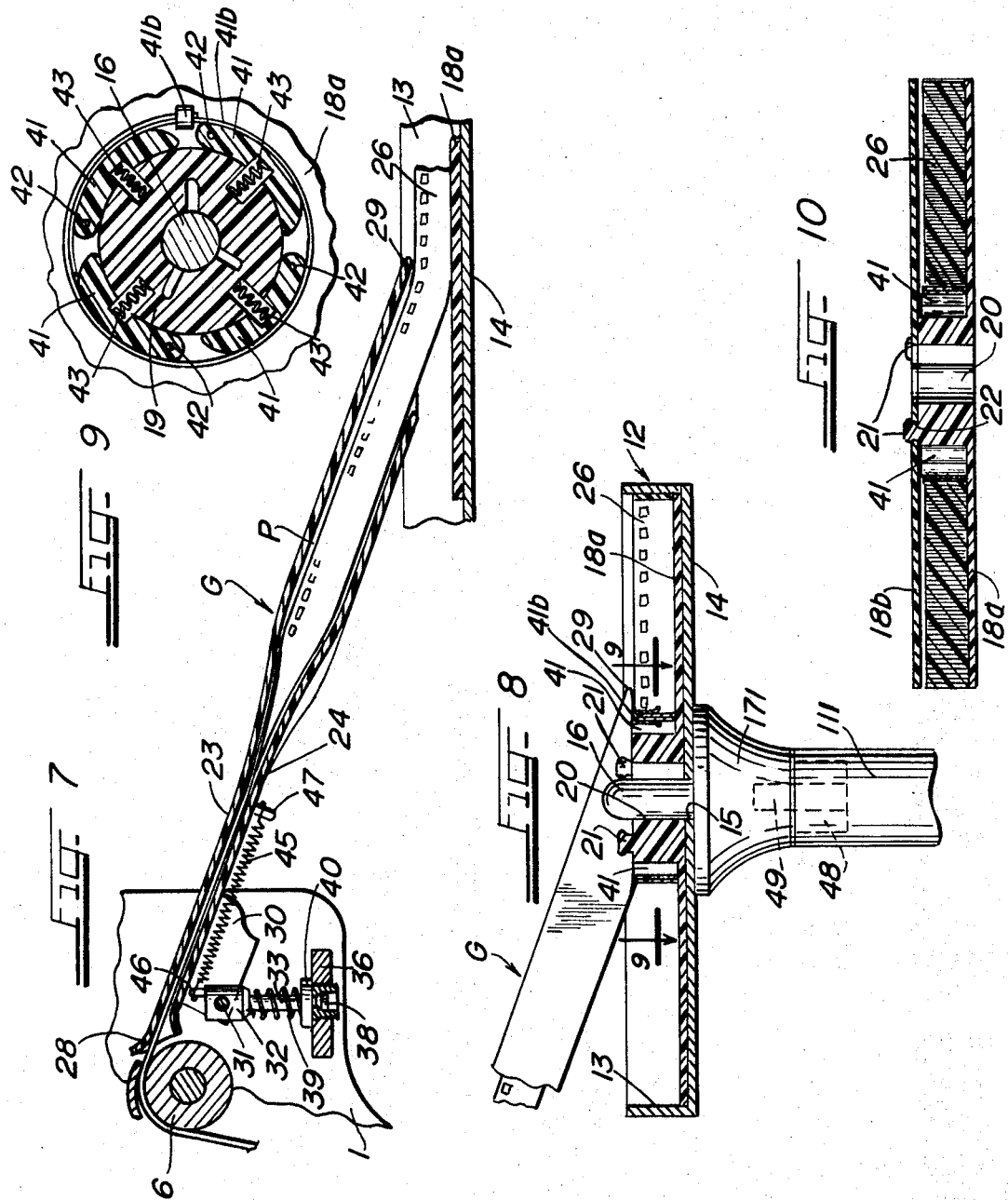
INVENTOR.
ROBERT ROSENBAUM
BY Rummler & Snow
ATTYS.

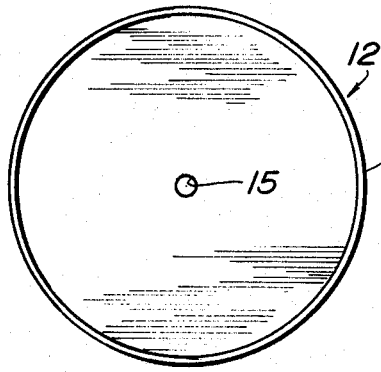
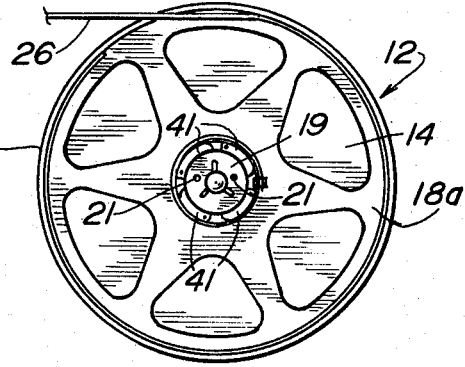
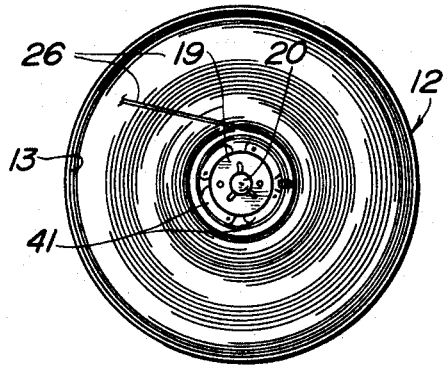
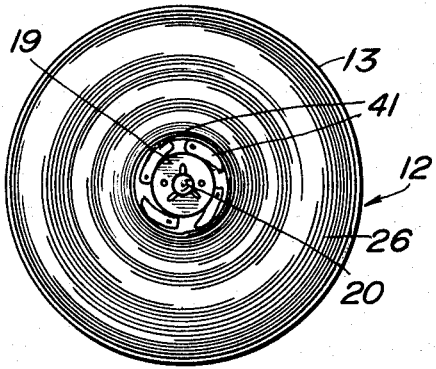
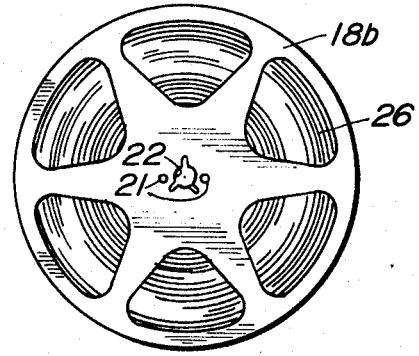
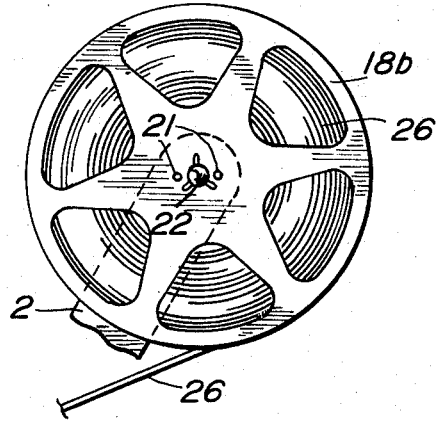
INVENTOR.
ROBERT ROSENBAUM June 18, 1968   R. ROSENBAUM   3,388,873
FILM REWIND FOR MOTION PICTURE PROJECTOR
Filed Sept. 8, 1966   8 Sheets-Sheet 6
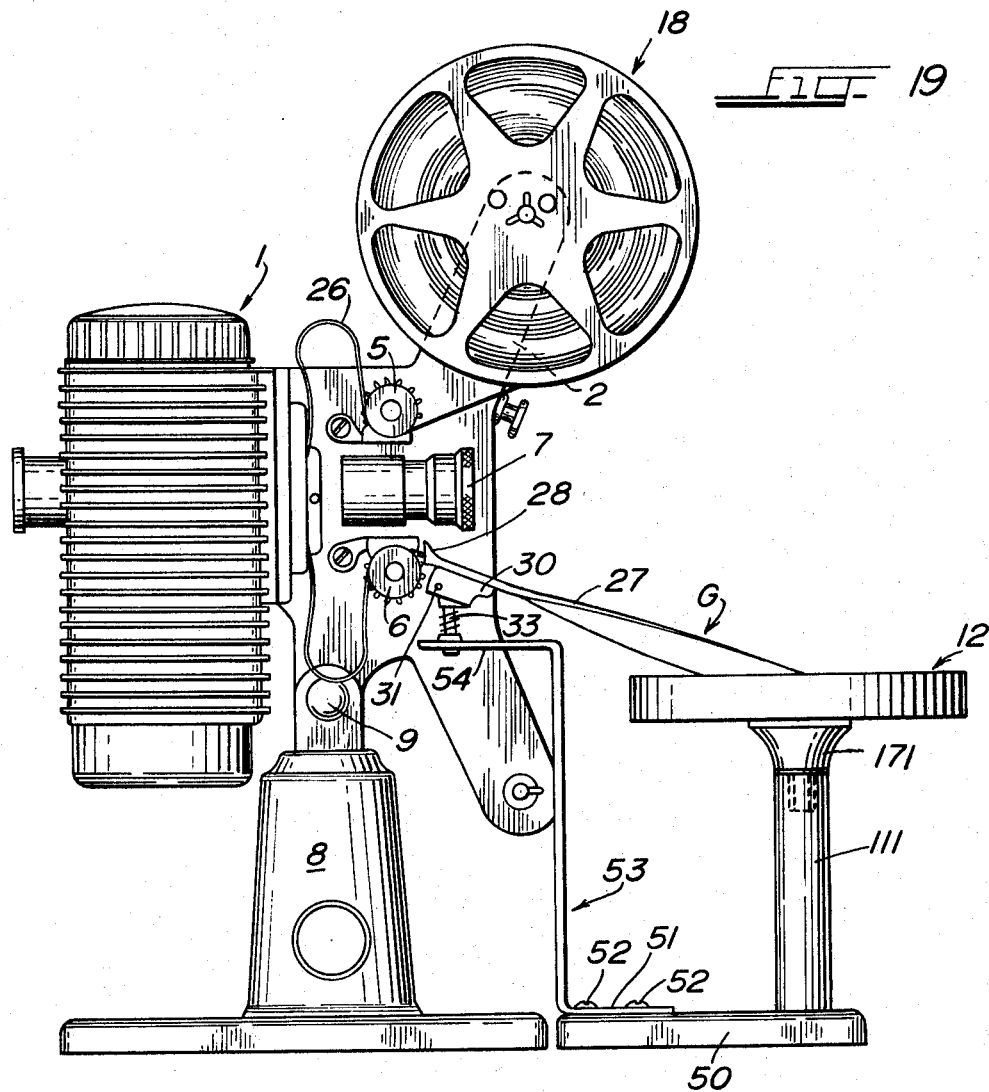
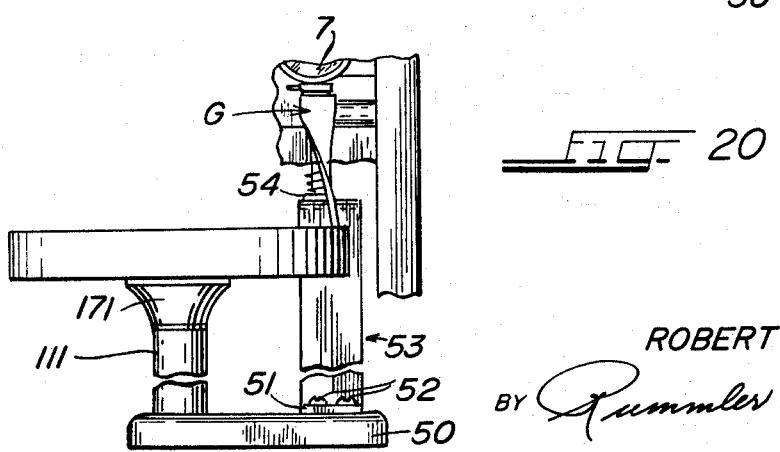
INVENTOR.
ROBERT ROSENBAUM June 18, 1968   R. ROSENBAUM   3,388,873
FILM REWIND FOR MOTION PICTURE PROJECTOR
Filed Sept. 8, 1966   8 Sheets-Sheet 7
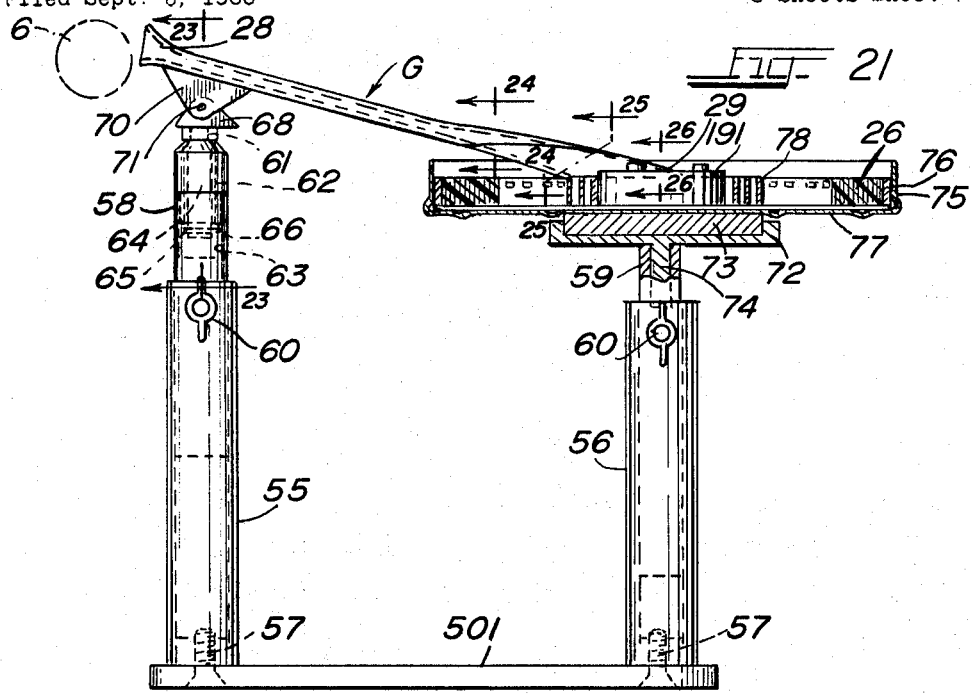
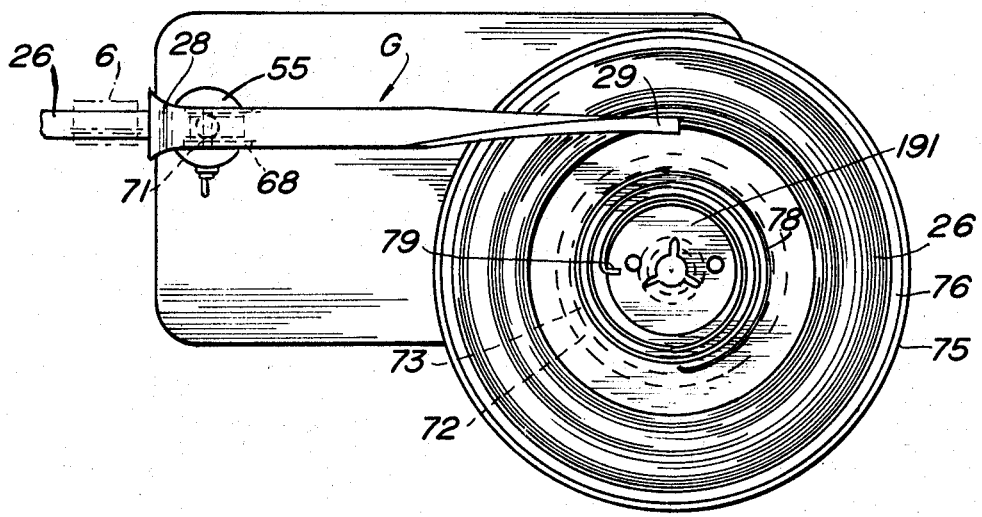
INVENTOR.
ROBERT ROSENBAUM June 18, 1968  R. ROSENBAUM  3,388,873
FILM REWIND FOR MOTION PICTURE PROJECTOR
Filed Sept. 8, 1966  8 Sheets-Sheet 8
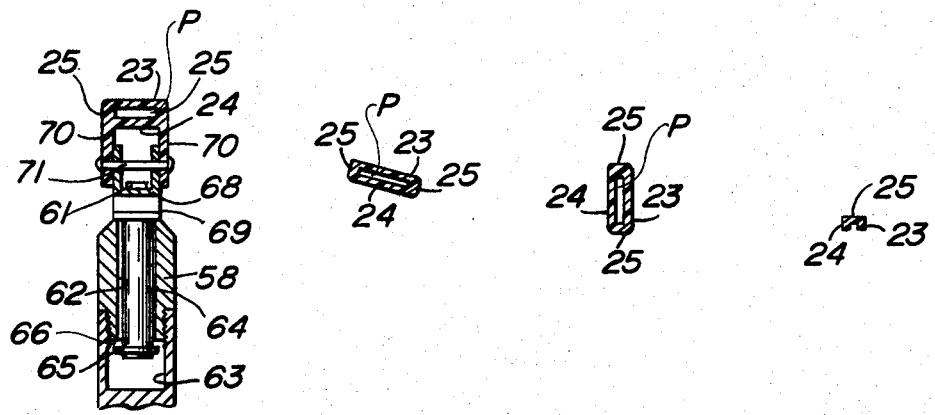
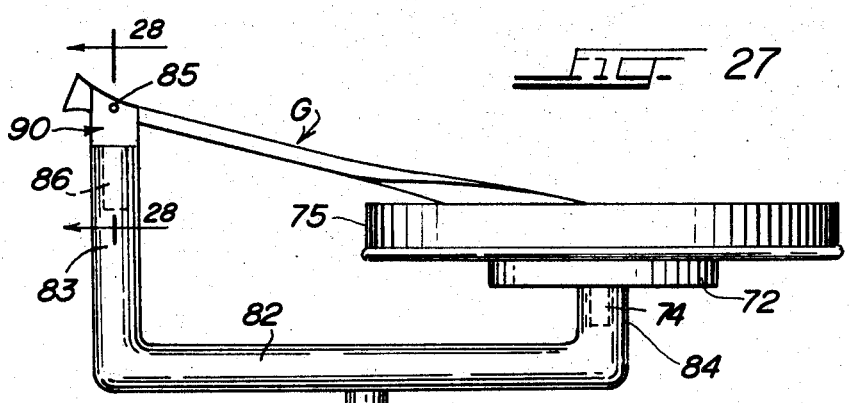
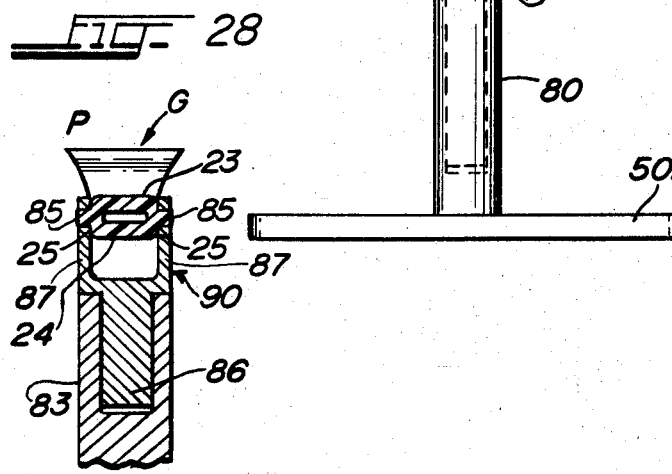
INVENTOR.
ROBERT ROSENBAUM
BY
Att'ys.

United States Patent Office 3,388,873
Patented June 18, 1968

3,388,873
FILM REWIND FOR MOTION PICTURE
PROJECTOR
Robert Rosenbaum, 6111 N. Washtenaw,
Chicago, Ill. 60645
Filed Sept. 8, 1966, Ser. No. 577,903
18 Claims. (Cl. 242—55.21)

ABSTRACT OF THE DISCLOSURE

A film projector is provided with a take-up stand having a rotatable housing to receive a take-up reel having a lower flange, hub and removable upper flange. Film is unwound from a supply reel, driven through the projector to a movable guide designed to twist the tape substantially 90 degrees from a horizontal plane to a vertical plane so as to lay the film on its edge near the outer periphery of the lower flange and progressively direct it toward the hub as the take-up reel rotates until the film is unwound whereupon the upper reel flange can be attached to said hub to allow the take-up reel to then be removed to serve as a supply reel.

This invention relates to film feeding, guiding and rewinding means such as used in connection with projectors and specifically to a device for rewindings a motion picture film on a reel in reverse coil form, i.e. from adjacent the periphery of the reel to adjacent the central axis thereof.

In the normal use of projectors with motion picture film, the film after leaving the discharge end of the projector is wound on a reel from adjacent the central axis thereof in coil form outwardly to adjacent the periphery of the reel. Thus this rewound coil of film must again be rewound on another reel in order to project it again with the beginning of the film adjacent the periphery of the spool. It was to overcome this defect that the present invention was conceived.

The main object therefor is to rewind a film emanating from a projector on a reel in reverse coil form whereby the beginning of the film lies adjacent the periphery of the reel.

Other objects are to provide guiding and feeding means wherein the leading end is positioned adjacent the discharge end of a projector whereby the film strip is automatically guided into a reel adjacent the outer periphery thereof on one of its edges; to provide a guiding and feeding means wherein the film strip passing therethrough changes from a plane normal to the long axis of the projector at its leading end to a plane normal to the plane of the leading end at the terminal end whereby the film upon exiting from the terminal end and entering the reel and housing will lie in a substantially vertical plane; to provide adjustable supports for the take-up reel and housing and the throat or leading end of a feed and guide means; to provide a rotary mount for the throat of the guide means; to provide a split reel for the device of the class described; to provide adjustable filler means for the reverse wound film coil at its innermost coil to prevent inward collapse of the film coil when the reel therefor is removed from its housing; to provide in a device of this character, a reel housing which is rotatable about its axis; to provide a split reel frame for rewinding a film in reverse coil form on one half thereof and when the coiling has been completed fully assembling both halves; to provide a split take-up reel which may be used for projection; to provide a support for a take-up reel, having a rotatable magnetic housing thereon supporting a reel metal can containing one-half of the take-up reel on which the film is wound in reverse coil form; and to provide an extremely facile and simple mechanism and means for reverse coil winding of a film, which is economical to manufacture and easy to assembly and may be used with a projector.

In the drawings:

FIG. 1 is a side elevation of a film projector with one form of the reverse coil wind mechanism of my invention.

FIG. 2 is an end elevation taken from the right side or forward end of FIG. 1.

FIG. 3 is a top view taken on the line 3—3 of FIG. 1 with guide shown in phantom outline.

FIG. 4 is a partial cross sectional view taken on the line 4—4 of FIG. 1.

FIGS. 5, 6, 7 and 8 are fragmentary cross-sectional views taken on the lines 5—5, 6—6, 7—7, and 8—8, respectively, of FIG. 3 all with parts broken away.

FIG. 9 is a cross-sectional view taken on the line 9—9 of FIG. 8.

FIG. 10 is a cross-sectional view of the split reel parts with the film fully rewound in reverse coil position therein, ready for use with a projector.

FIG. 11 is an exploded perspective view of the split reel and housing of my invention.

FIG. 12 is a perspective view of my split reel per se in assembled relationship with the strip film shown fully rewound therein, ready for projection.

FIG. 13 is a top plan view of the reel housing of my invention.

FIG. 14 is a top plan view of housing of FIG. 13 and the lower half of the reel shown in FIG. 11 housed therein showing the film strip being wound therein in reverse coil wind and with the first coil almost having been completed.

FIG. 15 is a top plan view of the device shown in FIG. 14 but showing the coil almost fully wound.

FIG. 16 is a top plan view of the device of FIG. 15 but with the film being completely rewound and also showing the inner retractable arms expanded to support the innermost coil to hold the entire coil from collapse inwardly when less than a full coil is rewound.

FIG. 17 is a top plan view of a completed rewound coil with the upper half section of the reel in place on the lower half to make a unitary structure with the film completely housed therein, and ready for viewing;

FIG. 18 is a side elevation of the reel of my invention mounted on the upper arm and shaft of the projector ready for the film to be threaded through the projector for projection purposes.

FIG. 19 is a side elevational view of a modified form of my invention.

FIG. 20 is a partial front elevational view of the same.

FIG. 21 is a side elevational view of another form of the structure of my invention.

FIG. 22 is a top view of the device of FIG. 21;

FIGS. 23, 24, 25 and 26 are cross-sectional views taken on the lines 23—23, 24—24, 25—25 and 26—26 respectively of FIG. 21.

FIG. 27 is another modified form of my invention.

FIG. 28 is a cross sectional view taken on the lines 28—28 of FIG. 27.

The essential concept of this invention is to reverse coil wind the projected film as it is exited from the projector, move it through a guide and feed means where it is fed into one-half of a split reel, on one of its edges, and be reverse coil wound in said reel and providing appropriate apparatus to accomplish this concept.

Referring in detail to the drawings the projector 1 is of the usual type found on the open market, which normally are provided with an arm 2 extending upwardly and forwardly containing a shaft 3 on which the reel 18 is rotatably supported in a vertical plane. The projector has the usual film driving sprockets 5 and 6, and the lens system 7. The projector is also provided with base 10 and an integral post 8 to which the projector support is pivotally secured thereto by pivot 9. The base is normally rectangular in shape to properly support the projector.

The details of the present invention will now be described.

A vertical post 11 is integrally formed on the forward end of the base 10 to support a film reel housing 12 which lies in a horizontal plane. The housing 12 is provided with an upstandnig wall 13 integrally formed to the peripheral edge of the bottom wall 14. The wall 14 is also provided with an aperture 15 for the reception of shaft 16, which shaft is integrally secured at its lower end medially to the upper surface of post 11. The aperture 15 is slightly larger than the diameter of the shaft whereby the housing 12 can be rotated therearound. The post 11 is also provided with an integrally formed flared portion 17 on its upper end whereby to support the bottom wall 14 about its axis.

The lower half 18a of the take-up reel 18 is also provided with an integrally formed hub 19 having an axial bore 20 therethrough for loosely seating on the shaft 16. The diameter of the bottom wall 14 and wall 13 is slightly larger than the diameter of the lower half 18a of the reel 18 whereby to readily and removably seat the reel part 18a.

The upper end of the hub 19 is provided with two or more pins 21 whereby to snugly effect amalgamation of the upper half 18b of the reel to the lower half 18a by the forcing of the upper half on the pins 21 through apertures 22 (see FIGS. 8–12) to produce the unitary reel 18 of FIG. 12.

The film strip guide means G comprises an elongated pair of spaced upper and lower walls 23–24 and side walls 25 forming an enclosed passageway P (see FIGS. 23–25) for the film strip 26. The guide means G is bent and or twisted substantially 90° between its ends as at 27 to produce a smooth free flowing bend. To achieve the main objects of this invention the film strip must enter the housing 12 in such a manner that the film will be positioned substantially vertically on its edge in proper alignment against the interior face of the housing wall 13 and the second coil will bear against the inner side of the first coil, etc. The film strip 26 coming from the projector 1 lies in a substantially horizontal plane. Thus it will enter the throat 28 of the guide means G in the same plane. However, as the film 26 is driven through the bend or twist 27 it will turn on its side edge and continue through the portion of the guide means between the bend and its terminal end 29 in a plane normal to the plane of the leading portion of the guide G.

The flared throat 28 is positioned adjacent and forwardly of the driving sprocket 6 to provide for easy entrance of the projected film as it leaves the sprocket 6.

The supporting structure for the guide means is clearly shown in FIG. 4 and comprises a pair of downwardly extending spaced ears 30, which are integrally formed on the lower wall 24, said ears having opposed apertures therein to receive a shaft 31 to span said ears 30 as shown in FIG. 4. The apertures are positioned adjacent the lower end of the ears and adjacent the rear end of the ears as shown in FIGS. 1 and 4. The shaft 31 is threaded through and adjacent the upper end of the headed member 32 whereby the guide member G is now pivotally secured to the shaft 31. A rod 33 is provided with a reduced section 34 at its upper end which is inserted through an appropriate vertically extending aperture in the headed member 32 and held there by a split ring 35 to prevent it from shifting out of the member 32. The vertically extending aperture is slightly larger in diameter throughout its length than the diameter of section 34.

The lower forward end of the projector 1 has an integrally formed arm 36 extending laterally therefrom as shown in FIG. 4. The free end of said arm 36 is provided with a bushing 37 for loosely seating the lower end of the enlarged portion 38 on the terminal end of rod 33 whereby to prevent the terminal end 38 from being displaced upwardly through the bushing 37 in which the headed lower end 38 and part of the lower end of the rod 33 seats. A compression spring 39 surrounds the rod 33, the lower end of the spring seating on the loosely fitted washer 40 while the upper end of the spring 39 bears against the lower end of the member 32. Thus rod 33 and appendages are normally urged upwardly to the position shown in FIG. 4, but is free to shift downwardly against the action of the spring if desired.

Thus the film guide G may be shiftable downwardly as well as being pivoted with rod 33 acting as the pivot. The terminal end of guide means G may be readily raised or lowered about shaft 31.

As clearly shown in FIG. 1 the guide means extends downwardly and forwardly from its throat 28 to its terminal end 29 where it loosely seats on the reel section 18a adjacent wall 13.

It is to be noted that upper wall 23 and a small portion of the side walls 25 are slightly longer than the lower wall 24 at the terminal end 29 (see FIG. 26) to assist in guiding the film 26 on its edge towards the wall 13 with the edge resting on the upper surface of the reel half 18a. Thus as the film is driven outwardly from the sprocket 6 it will move in a horizontal plane through the throat 28 of the guide means G and downwardly and forwardly through the twist bend portion 27 where it turns in a plane normal to the horizontal and moves to the terminal end 29 where the film rolls around and contacts the inner face of side wall 13 (see FIG. 14). Continuously being driven by sprocket 6 it will coil upon itself in a reverse coil wind towards the hub 19 until all the film has been fed from the projector (see FIGS. 14, 15 and 16).

As the film housing 12 is loosely held on the shaft 16 the friction caused by the film being coiled in the housing as well as the forward thrust of the film itself as it leaves the terminal end 29 will tend to cause the housing 12 to rotate clockwise thus preventing scratching of the film surfaces as it is being coiled in reverse coil form.

In the event there is not enough film to completely fill the housing 12 i.e. to the hub 19, I have provided a series of spring loaded arms 41 equally spaced around the hub 19. Each arm is pivotally connected at one end to the lower section 18a as at 42, to substantially encircle the hub 19 (see FIG. 9). The arms 41 are held against the hub 19 by a circular split spring 41a, the ends of the spring being held in circular form by a clip 41b. When the film coil fails to reach the closed arms 41, the coil being short of filling the reel 18a, the clip 41b and spring 41a are removed to allow the arms 41 to shift outwardly away from the hub 19 about their pivots 42, thus the arms 41 will bear against the innermost film coil to hold the inside of the film coil firmly in position so that it will not collapse.

When the film has all been wound in the housing 12 and on the reel half 18a, the upper half 18b of the reel 18 is affixed to the lower half 18a, as described above. The reel is then removed, placed in the usual reel film can and stored away for next projection. The film thus need not be rewound as is normal with film projectors on the market today. Since the hub 19 is provided with the usual slots 19a the unitary reel 18 is ready for installation on shaft 3 and insertable on the arms 3a for subsequent use with the projector.

As there is no lateral or upward pressures exerted on the forward end of the guide and feed means G the weight of the guide means itself or if necessary by adding a weight, will tend to exert pressure downwardly on the terminal portion 29, thus merely setting the terminal portion adjacent the wall 13 it will rest on or near the peripheral portion of the lower half 18a of the reel. As the coils are formed they will automatically shift the terminal portion 29 inwardly towards the hub 19, by the nature of the spring-like tension of the film 26.

Thus it should now be apparent that the device of FIGS. 1–7 eliminates the gears, shafts, etc. and appendages usually present in the normal rewind and take up arms on projectors today as well as eliminating the lower arm itself. It also eliminates the step of rewinding the film twice to have the film ready for projection. Thus the simplicity of the device of the present invention cuts down the cost of the manufacture of projectors considerably since substantially all parts may be made of plastic.

In the modification of my invention shown in FIG. 7, I have added tension spring 45 to tend to impart downward pressure on the terminal end 29 of the guide member G as it sets on the reel half 18a in the housing 12. One end of the spring 45 is anchored to a lug 46 extending upwardly from and forms a part of the headed member 32. The other end of spring 45 is anchored to a lug 47 extending downwardly from the lower wall 24 of the guide member G adjacent the twist 27. Thus this is the only change added to the device hereinbefore described in FIGS. 1 to 6, and the guide means G will still rotate about rod 33 and pivot upwardly and downwardly on shaft 31.

In FIG. 8 the flared portion 171 is not an integral part of post 111 as shown in FIG. 1 but rather is separated therefrom. Here the upper end of post 111 is bored axially to seat on axially bored bearing 48. The flared portion 171 has an axially positioned shaft 49 extending outwardly from its lower end. The lower portion of the shaft 49 seats in the bearing 48 whereby the flared portion and the housing 12 with its appendages are free to rotate.

In the modification of FIGS. 19 and 20 an adapter is disclosed for use with present day film projectors which will accomplish the objects sought to be achieved by the invention.

The lower leg 51 of a Z-shaped angle member 53 is secured to a base 50 by any suitable means such as screws 52. Adjacent the free end of the upper leg 54, the lower end of rod 33 with its bushing 37 are supported, similarly in all respects as described with reference to the arm 36 of FIG. 4. The base 50 also has the post 111 anchored to it with its appendages, as disclosed and shown in the device described in FIG. 8.

Thus the guide feed means G and the horizontally positioned film wind housing 12 are a complete separate unit from the projector, but may be used in conjunction therewith in the same manner as described heretofore.

As clearly shown in FIG. 7 the terminal end 29 of the guide means G tends to rise from the inner surface of reel half 18a as the film 26 begins to coil around the periphery of the inner face of wall 13. This is due, of course, to the height of the film, because the terminal end 29 bears on the upper edge of the film. By so doing it will positively keep the lower edge of the film on the upper surface of the reel half 18a.

The modification of FIG. 21 accomplishes the same results as heretofore expressed. Here the base 501 is separate from the projector as was the base 50 the modification of FIG. 19. A pair of spaced tubes 55–56 having their lower ends closed are fixed to the base 501 in space relationship, in any suitable manner such as by screws 57 whereby the tubes are positioned in a vertical plane. Rods 58–59 are telescopingly slidable in the interior of the tubes 55–56 respectively, and held in adjusted position by thumb screws 60.

The upper end of the rod 58 is provided with a reduced section 61 and the rod is bored axially as at 62 and has a communicating enlarged bore as at 63 whereby to slidably seat the telescoping member 64. The member 64 is provided with an enlarged integral washer 65 to prevent the member 64 from being withdrawn upwardly as the washer 65 lies below the shoulder 66 formed by the enlarged bore 63. The member 64 is loosely seated in the bore 62 whereby it is free to rotate.

A yoke 68 has an enlarged hollow cap portion 69 on its lower end to frictionally seat on the upper end of the reduced portion 61 of the rod 58. The guide and feeding means G is provided with a pair of downwardly extending spaced ears 70 which span the yoke 68 and the two are pivotally connected together by means of pivot rod 71 whereby the guide means is capable of being both pivoted about the axis of member 64 through its appendages as well as having limited upward and downward movement as is obvious from the foregoing description.

The upper end of rod 59 is provided with an axial bore to seat the stem 74 of a circular non-magnetic cup member 72. The cup 72 houses a permanent magnet 73. Thus the cup with its magnet is free to rotate about the stem 74 seated axially in the rod 59.

The lower half of the usual film storage can 75 is placed on the magnet so that the upper end of the can is open. Of course, the can should be placed with its peripheral edges medially of the shaft 74. After the reel half 18a is placed in the can 75 on its bottom wall 76, the side wall of the can is lined with circular paper liner 76 and its bottom edge will rest on the periphery of the reel half 18a. Thus the first coil of film entering the can will have one face lying against the liner and thus prevent the film from becoming scratched. The can 75 therefore takes the place of the housing 13 hereinbefore described but performs identical functions.

The hub 191 of the lower half 18a of reel 18, as shown in FIG. 21, is provided with encircling coils of a wide spring 78. It is to be noted that one end of the spring 78 is anchored to the periphery of the hub 191 as at 79. The spring is normally in its expanded position as show in FIG. 22 whereby to perform the same function as the arms 41 of FIG. 9 accomplishes, when the film coil fails to completely fill the reel, namely to keep the interior of the film coil, adjacent the hub, tightly against the coils extending outwardly therefrom.

Thus the device of FIG. 21 is adjustable at both ends, namely by the rods 58 which may raise or lower the throat of the guide means G and by rod 59 to raise or lower the cup 72. This, of course, is important since there are many types of projectors on the market where the sprocket 6 may be positioned any distance from the base of the projector, thus the requirement for adjustability of applicant's device.

This modification, it should now be apparent, performs the same function as stated in the objects but in a slightly different manner.

As will be apparent from FIGS. 23 through 26, respectively, where cross-sectional views have been taken through the guide and feeder means G from adjacent the rear end thereof, to the terminal end to show the various positions of the guide means G, to help illustrate the manner in which the film will be turned in a plane normal to the plane that the film entered the guide means.

The modification shown in FIGS. 27 and 28, disclose a base 502 having an integrally formed upstanding tube 80 secured to the base medially. The lower leg 81 of the T-shaped support telescopically seats in the tube 80 and is adjustably fixed therein by thumb screw 601. The free ends of the cross arm 82 have upstanding arms 83 and 84 integrally formed thereon. The arm 83 is of greater height than the arm 84. The side walls 25 of the forepart of the guide and feed means 9 are provided with opposed outwardly extending pins 85. As clearly shown in FIG. 28, a Y-shaped or yoke member 90 has two space arms 87 extending upwardly from the cylindrical pintle 86. Each arm is provided with appropriately spaced opposed apertures in their upper end to receive the respective pins 85, to allow the guide G to pivot upwardly and downwardly about said pins 85.

The upper end of the arm 83 is bored axially wherein the pintle 86 seats. Thus the guide means G is rotatable about the pintle 86. The upstanding arm 84 is also bored axially inwardly to receive the shaft 74 and its appendages, they being the same as those shown in any of the aforesaid FIGURE 21.

Thus the device of FIG. 27 is probably the very simplest form that the present invention can take. It

I claim:

1. A device for use with a projector to guide and feed the film in reverse coil form on a take-up reel, a hollow elongated rectangular in cross section guide and feed means to receive the film from the projector after it has been projected, a support for said guide means for positioning one end of said guide means adjacent the projector, pivotal means on said support whereby said guide means is rotatable, a take-up reel having a removable flange, a rotatable housing supporting said reel, means to support said housing, whereby as the film is driven through said guide means it will feed onto said reel and into said housing and coil therein in reverse coil form.

2. The device according to claim 1 wherein the guide and feed means is provided with an enlarged end adjacent the projector, and said guide and feed means having a twist therein substantially medially of its ends.

3. The device according to claim 1 wherein said respective support means are arranged to orient the guide means relative to the housing so that the film is directed to the reel on one of the film edges.

4. A device for use with a film projector to guide and feed the film in reverse coil form after projection onto a reel comprising an adjustable vertically disposed standard, a horizontally disposed reel, rotatable supporting means seated on the upper end of said standard, said supporting means having an upstanding peripheral wall, one-half of a film reel seated in said means and having a vertically extending axial hub integrally formed thereon adapted to receive a removable flange, a second vertically disposed standard, a vertically extending rod rotatably mounted in the upper end of said standard, an elongated hollow film guide and feed means open at both ends, one end of said guide means pivotally secured to said rod and the opposite end positioned in said supporting means adjacent the inner wall thereof, said guide and feed means having a permanent twist therein substantially medially of its ends, and an enlarged throat at one end of said guide means to lie adjacent the projector, whereby when film is fed into said guide means it will be reverse coil wound in said supporting means and on said reel half.

5. A device for use with a film projector to guide the projected film from the projector as it moves outwardly therefrom in a substantially horizontal plane, and rewind it in reverse coil form, comprising a base, a vertically disposed standard on said base, a vertically extending spindle secured medially and rotatable in said standard, an open housing having a bottom wall and an upstanding side wall around the periphery of the bottom wall, an aperture axially positioned in said bottom wall for seating on said spindle, one-half of a film take-up reel having an upstanding axial hub adapted to receive a second half, said take-up reel being positioned in said housing, an elongated hollow guide and feed means pivotally secured at one end to said spindle and adjacent the film exit from the projector to receive the projected film, said guide means having a permanent twist therein substantially medially of its ends whereby the other end of said guide means lies in a plane substantially normal to plane of the opposite end of said guide means, the terminal end being positioned substantially vertically adjacent the inner face of said side wall and on said reel half.

6. The device according to claim 4 wherein said open housing is the lower half of a reel storage can, and said spindle supports a non-magnetic cup, having a permanent magnet therein on which said can is medially positioned.

7. The device according to claim 4 wherein said open housing is the lower half of a reel storage can, and said spindle supports a cup having a permanent magnet therein on which said can is medially positioned.

8. A device for use with a motion picture film projector to reverse coil wind the projected film in a take-up reel, comprising a base, a substantially hollow vertical post on said base, a substantially T-shaped supporting structure, the vertical leg of said supporting structure being adjustably positioned in said hollow post, each end of the horizontal cross bar of said supporting structure having an integrally formed upstanding leg, each bored axially from their free ends, one of said legs being longer than the other, a housing having an upstanding peripheral side wall and a downwardly extending rotatable axial pintle, said pintle seated in said bore of said shorter leg one-half of a split film reel housed in said housing and having an upstanding axial hub adapted to receive a removable flange, a guide and feed means for directing the film exiting from the projector into said housing on one edge and reverse coil wind the film in said housing on said one half film reel.

9. The device according to claim 8 wherein the longer leg supports a rotatable rod pivotal means on said rod and guide means to support said guide means adjacent the projector.

10. The device according to claim 5 wherein the hub is provided with expandable means around its perimeter for supporting the interior of the coil rewound film.

11. The device according to claim 5 wherein the hub is provided with a coil of flat spring wire around its perimeter and having one end secured thereto, whereby to support the interior of the film coil as it approaches the hub of the reel half.

12. The device according to claim 8 wherein the guide and feed means is open ended and an elongated hollow housing having side, top and bottom walls and having a permanent twist therein substantially medially of the ends.

13. The device according to claim 12 wherein the side walls of the guide and feed means adjacent the end where the projected film enters the guide means is provided with opposed projecting pins, and wherein the upper end of the longer leg is provided with a yoke having an integrally formed downwardly extending pintle which seats in bore of said longer leg, said yoke having opposed apertures in which said pins seat whereby said guide means is both pivotal and rotatable.

14. The device according to claim 13 wherein the hub is provided with expansible means around its perimeter whereby the support the inner coil of rewound coil of film.

15. A device for use with a film projector to guide and feed the film in reverse coil form after projection onto a reel comprising an adjustable vertically disposed standard, a horizontally disposed reel, rotatable supporting means seated on the upper end of said standard, said means having an upstanding peripheral wall, one half of a flanged film reel seated in said means and having a vertically extending axial hub integrally formed thereon adapted to receive a second flange, a second standard, a vertically extending rod rotatably mounted in said standard, an elongated hollow film guide and feed means open at both ends, one end of said guide means pivotally secured to said rod and the opposite end positioned in said supporting means adjacent the inner wall thereof, said guide and feed means having a permanent twist therein substantially medially of its ends, and an enlarged throat at one end of said guide means to lie adjacent the projector, whereby when film is fed into said guide means it will be reverse coil wound in said supporting means and on said reel half.

16. The device according to claim 15 wherein the second standard is Z-shaped, and the lower leg is anchored to said base.

17. The device according to claim 10 wherein the expansible means comprises a series of spring loaded arms substantially enclosing the perimeter of said sub.

18. The device according to claim 17 including releasable means for holding spring loaded arms against the hub.

References Cited

UNITED STATES PATENTS

| | | | |
|---|---|---|---|
| 1,119,489 | 12/1914 | Bingham | 242—55.21 |
| 1,134,664 | 4/1915 | Bingham | 242—55.21 |
| 1,183,705 | 5/1916 | Whitesell | 242—55.21 |
| 1,507,258 | 9/1924 | Shirlow et al. | 242—55.21 |
| 2,182,723 | 12/1939 | Feller | 242—55.21 |
| 2,335,179 | 11/1943 | Feller | 242—55.21 XR |
| 3,153,517 | 10/1964 | Blank et al. | 242—55.21 |
| 3,239,159 | 3/1966 | Cohen | 242—71.8 |
| 3,292,875 | 12/1966 | Rojic | 242—55.21 |

BILLY S. TAYLOR, *Primary Examiner.*